J. A. MAHR.
TIRE HEATING DEVICE.
APPLICATION FILED JULY 14, 1909.

945,966.

Patented Jan. 11, 1910.
2 SHEETS—SHEET 1.

Witnesses.
A. H. Opsahl.
E. C. Skinkle.

Inventor.
J. A. Mahr
By his Attorneys.
Williamson Merchant

J. A. MAHR.
TIRE HEATING DEVICE.
APPLICATION FILED JULY 14, 1909.

945,966.

Patented Jan. 11, 1910.
2 SHEETS—SHEET 2.

Witnesses.
A. H. Opsahl.
E. C. Skinkle

Inventor
J. A. Mahr.
By his Attorneys
Williamson & Merchant

UNITED STATES PATENT OFFICE.

JULIUS A. MAHR, OF MINNEAPOLIS, MINNESOTA.

TIRE-HEATING DEVICE.

945,966.

Specification of Letters Patent.

Patented Jan. 11, 1910.

Application filed July 14, 1909. Serial No. 507,530.

*To all whom it may concern:*

Be it known that I, JULIUS A. MAHR, a citizen of the United States, residing at Minneapolis, in the county of Hennepin and State of Minnesota, have invented certain new and useful Improvements in Tire-Heating Devices; and I do hereby declare the following to be a full, clear, and exact description of the invention, such as will enable others skilled in the art to which it appertains to make and use the same.

My invention has for its object to provide a highly efficient tire heating device especially adapted for use to expand the tires of car wheels and engine truck wheels for the purpose of applying the same to the wheels or removing the same therefrom.

To the above ends, the invention consists of the novel devices and combinations of devices hereinafter described and defined in the claims.

In the accompanying drawings which illustrate the invention, like characters indicate like parts throughout the several views.

Figure 1:
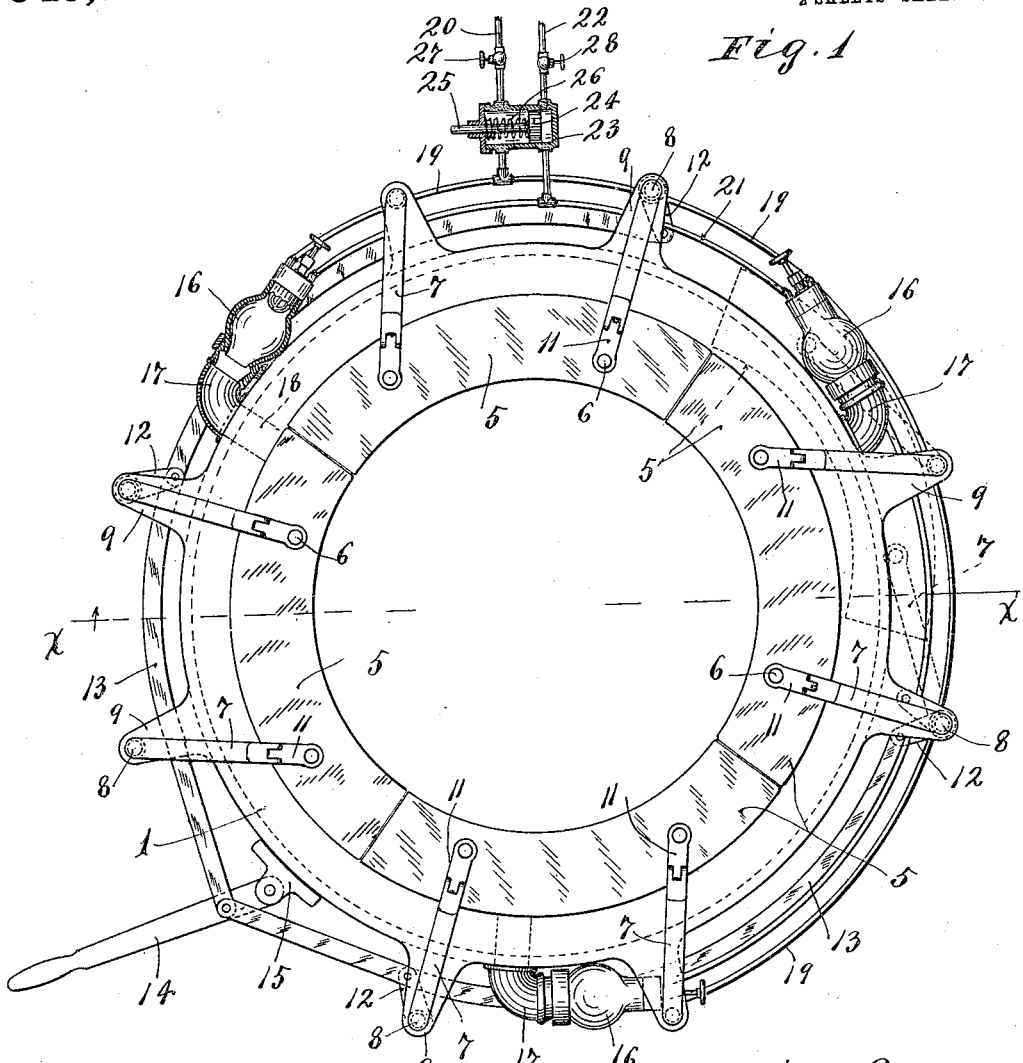
Figure 2:
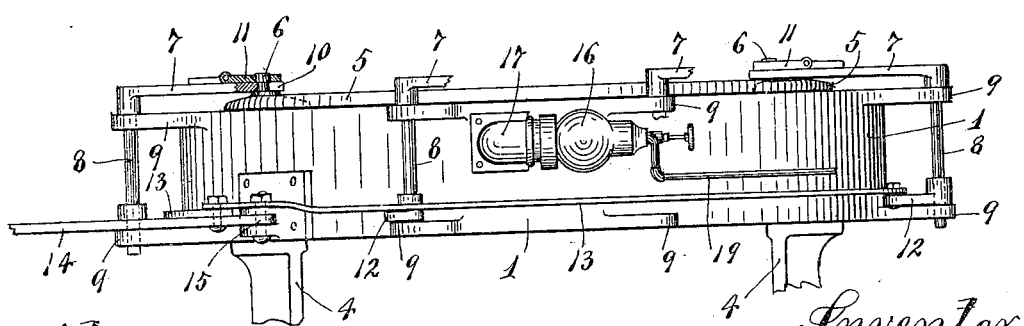
Figure 3:
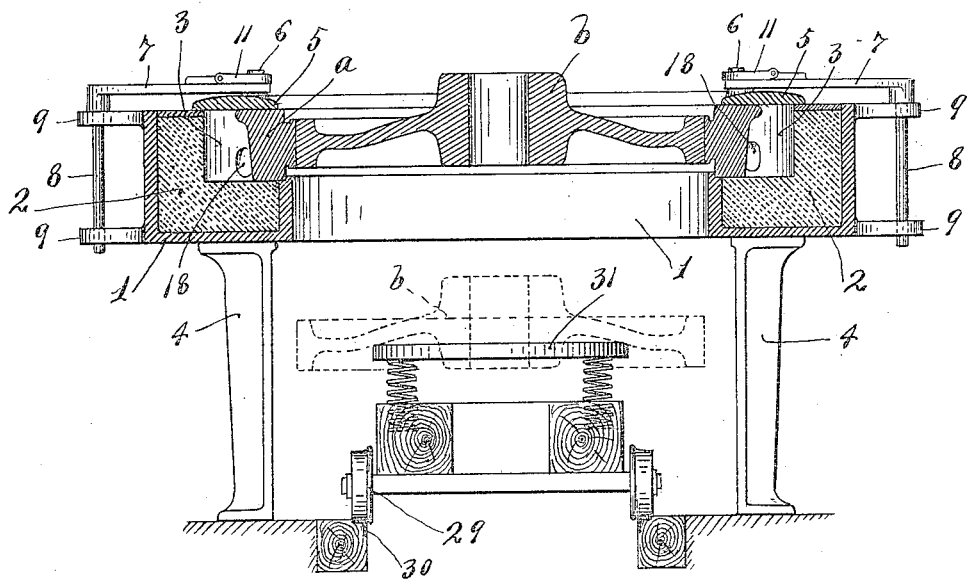

Figure 1 is a plan view of the improved tire heating device, some parts being sectioned; Fig. 2 is a side elevation of the tire heating device, some parts being broken away; and Fig. 3 is a vertical section taken through the device on the line $x^3$ $x^3$ of Fig. 1, showing in connection with the tire heating device, a truck for receiving and carrying away wheels dropped from expanded tires.

In this improved device, the tire is exposed to a flame contained within an annular combustion chamber, and the heat is preferably produced by a multiplicity of burners arranged to deliver the flame into this combustion chamber where it will come into contact with the outer surface of the tire. Preferably this annular combustion chamber is formed within an annular casting or box 1 that is rectangular in cross section, but the upper portion of the inner wall of which, and the inner half of the upper wall of which are cut away, so that the outer portion of a tire $a$ may be placed within said annular chamber. The annular casting 1, at its bottom and outer portion, is provided with an annular lining 2 of fire brick or clay, which is made approximately L-shaped in cross section so that the annular combustion chamber 3 is formed immediately around a tire $a$ which is rested upon the relatively low inner wall of the casting 1, and upon the lower portion of a lining 2, as shown in Fig. 3. The said annular casting 1 is supported in an elevated position by legs 4 and the opening at the center of the same is large enough to permit the body $b$ of the wheel to drop through the same when the tire has been expanded sufficiently to drop the said wheel body.

The space between the rim flange of the tire $a$ and the upper plate of the annular casting 1 is adapted to be closed by a plurality of segmental cover plates 5, of which as shown, there are four, and the four, when in the closed position shown in the drawings, forming an annular cover with sufficient leakage between joints to permit a slow discharge of the products of combustion from within the combustion chamber 3. Each of these segmental cover sections 5 is shown as provided with a pair of headed studs 6 that are inserted through and pivotally mounted in the free ends of rims 7 secured to the upper ends of short vertical shafts 8, mounted in radial projecting lugs 9 on the annular box 1. To detachably, but pivotally connect the rims 7 to the cover plates 5, said rims are provided at their free ends with slots 10 adapted to receive the reduced portions of the studs 6, and to engage the heads of said studs and hold the latter against sliding movements out of the seats 10, said rims 7 are further provided with pivoted lock pieces 11, (see particularly Fig. 2.) At their lower ends, every other shaft 8 is provided with an arm 12. There being eight of the shafts 8, and hence four of the arms 12, two of the arms 12 at one side, are connected to a curved connecting rod 13 and two arms 12 on the other side, are connected to a similar curved connecting rod 13. The extended ends of the two connecting rods 13 are pivotally connected to a common operating lever 14 which is shown as pivotally connected to a bearing 15 and the annular box 1. By movements of the lever 14 in one direction, the segmental cover plates 5 will be simultaneously moved from their closed or operative positions indicated by full lines in Figs. 1 and 2 into open positions, indicated in part only by dotted lines in Fig. 1. Obviously, reverse movement of the lever 14 will simultaneously move the said cover plates from their open into their closed positions. In their open positions, the cover plates are moved entirely outward of the space occupied by the tire $a$ when positioned in the combustion chamber, so that the tire may then be freely removed or placed in position.

The flame for heating the tire is preferably afforded by a multiplicity of oil burners 16, the discharge nozzles 17 of which are connected to the annular combustion chamber 3 through ports 18 that lead through the outer wall of the annular box 1 and through the upwardly extended portion of the lining 2. The flame is thus delivered at several different points into the annular combustion chamber 3 and may be circulated entirely through the said combustion chamber, thereby coming into direct contact with the entire peripheral portion of the tire.

The burners which are preferably employed, are of the type disclosed and claimed in my copending application S. N. 507,531 filed of date July 14, 1909, entitled "Oil burner." In this type of burner, both air and oil are supplied thereto; and in the arrangement shown, the several burners are connected by a pipe 19 and an oil supply pipe 20, and furthermore, the said several burners are connected by a pipe 21 to an air supply pipe 22. Preferably oil and air will be supplied to the pipes 20 and 22 respectively under the same, or aproximately the same pressure. For an important purpose, it will be noted that a small cylinder 23 is connected in both of the pipes 20 and 22.

Working in a cylinder 23, is a piston 24, the stem 25 of which works outward through one end of the cylinder. A spring 26, which surrounds the piston stem 25, tends to move the piston into its customary position toward the right, shown in Fig. 1. This spring, however, is of such light tension that when the piston is subject to the same pressure on both sides, said piston will, because of the smaller effective surface on the left hand side, be moved from the right toward the left, and will be held in a position considerably farther toward the left than shown in Fig. 1, as long as both oil and air are being delivered to the burners. The pipes 20 and 22 are provided respectively with valves 27 and 28 by means of which the oil and air may be turned on and cut off at will. As stated, when both the air and oil are turned on, the piston will be moved toward the left. When, however, the oil and air are cut off, the piston 24, by its movement from the left toward the right, will draw back into the cylinder from the burner, surplus oil or oil which if not drawn back would drop from the burner and be wasted.

In Fig. 3, I have shown a truck 29 arranged to run upon rails 30 and provided with a spring-supporting annular platform 31, onto which a wall body b dropped from an expanded tire a is adapted to be dropped and caught with a cushion or spring action.

In actual practice, the efficiency of the tire heating apparatus above described has been demonstrated.

What I claim is:

1. In a tire heating device, an annular box having an annular combustion chamber adapted to receive the tire and provided with a central opening through which the body of the wheel may be dropped.

2. In a tire heating device, the combination with an annular box having an annular combustion chamber, with flame delivery ports, of burners connected to said ports, a cover for said combustion chamber made up of segmental sections, and connections for simultaneously moving the said cover sections outward and inward to and from working positions, substantially as described.

3. In a tire heating device, the combination with an annular box having an annular combustion chamber and means supporting the same in a horizontal elevated position, of burners for delivering flame into said combustion chamber at different points, a cover for said combustion chamber made up of segmental sections, upright shafts journaled in bearings on said annular box, arms on the upper ends of said shafts pivotally connected to said cover sections in pairs, and a lever with connections for simultaneously moving said shafts and heads of said cover sections, substantially as described.

4. In a tire heating device, the combination with an annular box having an annular combustion chamber, and means supporting the same in a lifted horizontal position, of a cover for said combustion chamber made up of segmental sections, upright shafts journaled in bearings on said annular box, arms secured to the upper ends of said shafts and detachably pivoted in pairs to said cover sections, arms on the lower ends of said shafts, and an operating lever and rods connecting the same to the lower arms of said shafts, for simultaneously moving said cover sections to and from operative positions, subtantially as described.

In testimony whereof I affix my signature in presence of two witnesses.

JULIUS A. MAHR.

Witnesses:
 ALICE V. SWANSON,
 HARRY D. KILGORE.